(12) United States Patent
Ambo et al.

(10) Patent No.: US 8,378,214 B2
(45) Date of Patent: Feb. 19, 2013

(54) HARNESS CONNECTION MEMBER

(75) Inventors: Tsugio Ambo, Kumagaya (JP);
Yoshikazu Tanaka, Kumagaya (JP);
Tomokazu Matsumoto, Kumagaya (JP);
Satoru Fujiwara, Kumagaya (JP)

(73) Assignees: Furukawa Electric Co., Ltd., Tokyo (JP); Furukawa Automotive Systems, Inc., Shiga-ken (JP)

( * ) Notice: Subject to any disclaimer, the term of this patent is extended or adjusted under 35 U.S.C. 154(b) by 621 days.

(21) Appl. No.: 12/520,983

(22) PCT Filed: Sep. 26, 2007

(86) PCT No.: PCT/JP2007/068630
§ 371 (c)(1),
(2), (4) Date: Nov. 12, 2009

(87) PCT Pub. No.: WO2008/081626
PCT Pub. Date: Jul. 10, 2008

(65) Prior Publication Data
US 2010/0096184 A1      Apr. 22, 2010

(30) Foreign Application Priority Data

Dec. 28, 2006 (JP) ................................. 2006-354755
Apr. 13, 2007 (JP) ................................. 2007-105455

(51) Int. Cl.
*H01B 7/00* (2006.01)
*H02G 3/04* (2006.01)
*H01R 4/24* (2006.01)
*H01R 4/26* (2006.01)
*H01R 11/20* (2006.01)
*H01R 31/08* (2006.01)

(52) U.S. Cl. ........................ 174/72 A; 439/398; 439/507
(58) Field of Classification Search ................ 174/72 A,
174/152 G, 153 G, 72 R; 361/824, 826; 439/189,
439/398, 457, 604, 606, 723, 790, 792, 796,
439/498, 507, 718, 722, 798, 810, 811
See application file for complete search history.

(56) References Cited

U.S. PATENT DOCUMENTS 4,544,220 A * 10/1985 Aiello et al. ................... 439/594
7,883,361 B2 * 2/2011 Ambo et al. ................... 439/507

FOREIGN PATENT DOCUMENTS

DE    200 04 507 U1    9/2000
JP    52-5285           1/1977

(Continued)

OTHER PUBLICATIONS

Attached an English translation of DE 20004507U1 from EPO website.*
English Language International Search Report dated Dec. 25, 2007 issued in corresponding Appln. No. PCT/JP2007/068630.

*Primary Examiner* — Timothy Thompson
*Assistant Examiner* — Roshn Varghese
(74) *Attorney, Agent, or Firm* — Holtz, Holtz, Goodman & Chick, PC

(57) ABSTRACT

A harness connection member has a cover member. In fitting a cover member to a holder, a split slit is opened with use of a slit, and wires are inserted into the holder. Thereafter, the cover member is moved to the holder, then moved over one projected annular part of the holder, and fitted into the projected ring parts. A concaved strip part is fitted to a convexed strip part to complete the installation, whereby the cover member cannot be moved relative to the holder in both longitudinal and circumferential directions.

14 Claims, 5 Drawing Sheets

FOREIGN PATENT DOCUMENTS

| | | |
|---|---|---|
| JP | 63-139768 U | 9/1988 |
| JP | 9-147930 A | 6/1997 |
| JP | 11-86998 A | 3/1999 |
| JP | 11-178142 A | 7/1999 |
| JP | 2005-71614 A | 3/2005 |
| WO | WO 2007049724 A1 * | 5/2007 |

* cited by examiner

HARNESS CONNECTION MEMBER

This application is a U.S. National Phase Application under 35 USC 371 of International Application PCT/JP2007/068630 filed Sep. 26, 2007.

FIELD OF THE INVENTION

The present invention relates to a harness connection member for use in harness circuits provided in, for instance automobiles.

BACKGROUND OF THE INVENTION

In a harness circuit, it is often required to provide one or more branch electric wires from a main electric wire. Heretofore, there have been widely proposed two joint methods, i.e. a splice joint method in which a part of an electrically insulating sheath of the main electric wire is removed and one or more branch electric wires are connected by clamping them to an exposed core conductor of the main electric wire, and a joint connector method in which a circuit branch connector is arranged at a terminal of the main electric wire and conventional connectors having clamp terminals connected to the main wire and branch wires are inserted into the circuit branch connecter to constitute the branch circuit. The later method is disclosed in a Japanese Patent Document 1 mentioned later.

In the splice joint method, electric wires have to be connected to the main electric wire in such a manner that a group of one to three branch wires is connected by clamping, and therefore after connecting the branch wires, the harness is difficult to be handled. Moreover, the joint work could not be carried out on a manufacturing line, and therefore the splice joint method is not suitably applied to the line production.

The joint connector method has been developed to overcome the above mentioned drawbacks of the splice joint method. In the joint connector method, the joint connection can be performed on a harness manufacturing line, and therefore a production efficiency is superior to the splice joint method and a design change of harness circuit can be easily effected. However, the number of parts such as connectors, cooperating conventional connectors, bus bars, connection terminals and so on is increased, and thus a relatively longer time period is required for assembling harness circuits.

In particular, the known joint connector methods disclosed in the Japanese Patent Document 1 still contains various problems to be solved. For instance, space saving of the harness circuit, improvement in workability, simplification of harness circuit structure and improvement in an electric current capability are required. Furthermore, upon forming the branch circuits, the branch connection member is liable to be damaged and an electrical insulation could not be easily obtained.

In order to avoid the above mentioned damage for keeping the good electrical insulation, a Japanese Patent Document 2 has proposed a protection method and a jig using a thermal shrinkage tube. However, this protection method requires a heat source, and therefore an installation is liable to be large and the workability is not good.

Means for Solving the Problems

Japanese Patent Document 1: Japanese Patent Kokai 2005-71614

Japanese Patent Document 2: Japanese Patent Kokai Hei 11-178142

DISCLOSURE OF THE INVENTION

Problems to be Solved by the Invention

In order to prevent the above mentioned damage of the connection members, it has been also proposed to wind an insulating tape around the branch connection members. However, this taping operation apparently increases the number of manufacturing steps.

The present invention has for its object to provide a novel harness connection member, in which the above mentioned problems can be solved and a protection cover member can be easily mounted.

Merits of the Invention

In the harness connection member according to the invention, harness connection member is protected by a cover member, and therefore the electrical insulation and reliability can be improved.

Figure 1:
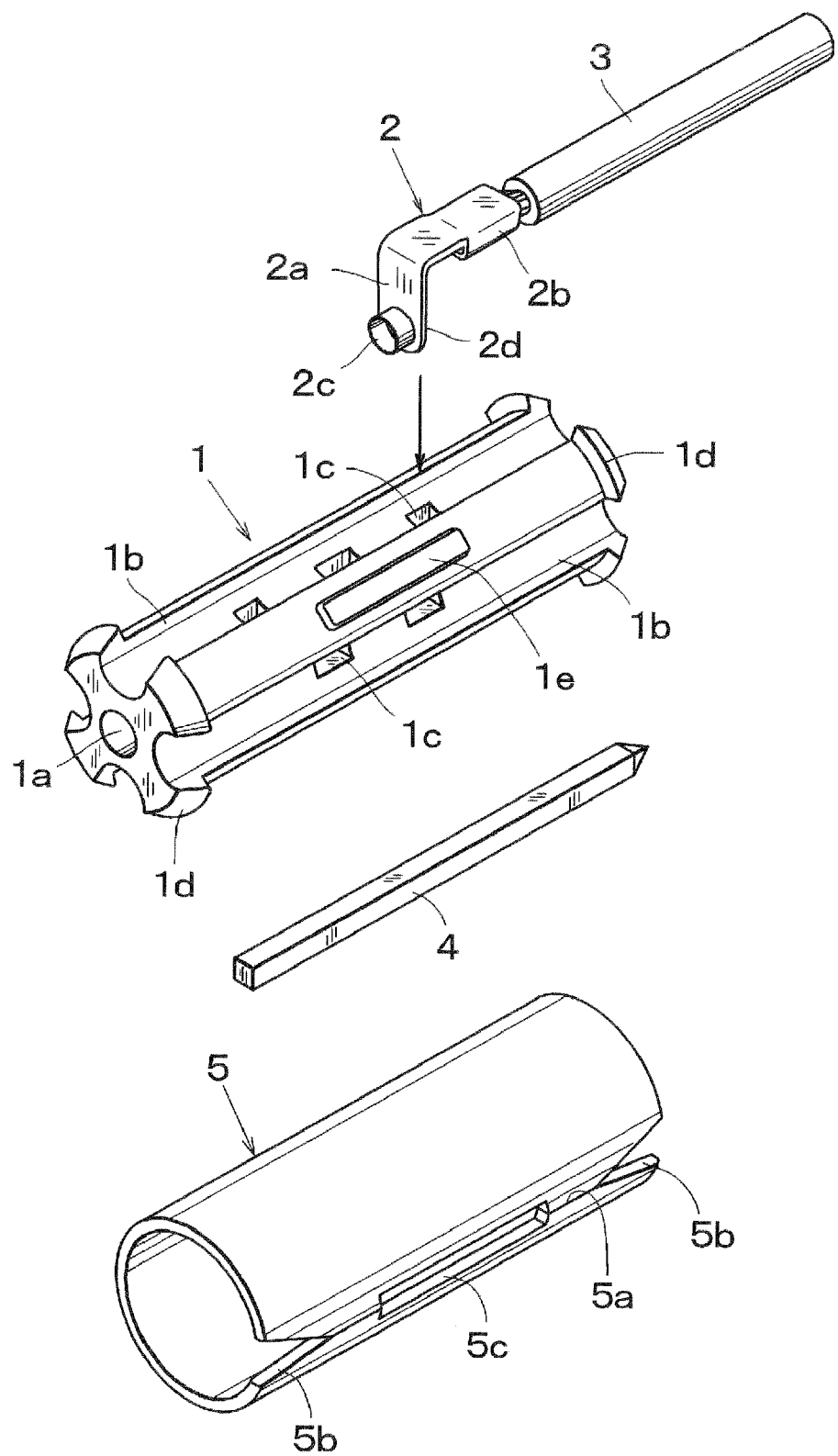
FIG. 1 is an exploded perspective view showing an embodiment of the harness connection member according to the invention.

EXPLANATION OF THE REFERENCE NUMERALS 1, 1' holder
1a pin terminal insertion hole
1b elongated groove
1c electric terminal insertion hole
1d d annular projection
1e linear projection
2 electric terminal
2a connecting portion
2b clamping portion
3 electric wire
4 pin terminal
5 cover member
5a split slit
5b cut-out portion
5c elongated recess

BEST MODES OF THE INVENTION

Now the present invention will be explained in detail with reference to embodiments shown in the drawings.

Embodiment 1

As shown in FIG. 1 the harness connection member of the embodiment 1 is mainly consisting of a holder 1 having a pin terminal insertion hole 1a, elongated grooves 1b and electric terminal insertion holes 1c; a plurality of electric terminals 2 each having a connecting portion 2a to be inserted into the electric terminal insertion hole 1c of the holder 1 and a clamping portion 2b at which a core conductor of an electrical wire 3 is clamped; a pin terminal 4 for mutually connecting a plurality of electric terminals 2; and a cover member 5 for covering the outer surface of the holder 1.

The holder 1 is formed by a substantially cylindrical body made of a synthetic resin and the pin terminal insertion hole 1a is formed along a central axis of the holder 1 and four elongated grooves 1b each having a semicircular cross sectional shape are formed in an outer surface of the holder 1 such that the elongated grooves 1b extend in an longitudinal direction. In a bottom surface of each of the elongated grooves 1b there are formed one or more electric terminal insertion holes 1c such that the electric terminal insertion holes 1c are communicated with the electric pin insertion hole 1a. Each of the electric terminal insertion holes 1c is formed such that the connecting portion 2a of the electric terminal 2 is stably inserted into the electric terminal insertion hole 1c.

It should be noted that a pair of elongated grooves 1b may be formed in the outer surface of the holder 1 such that the elongated grooves are aligned horizontally or vertically, although this structure is not shown in the drawings. Alternatively, it is not always necessary to form the elongated groove 1b.

On both ends of the holder 1 there are formed annular projections 1d. Each of the annular projections 1d has outwardly projected portions at positions except for portions at which the elongated grooves 1b are formed. As will be explained later, the cover member 5 is clamped between the annular projections 1d formed at both ends of the holder 1. Furthermore, on an outer surface of the holder 1, there is formed a linear projection 1e which extends in the longitudinal direction. Inner surfaces of the annular projections 1d are formed to constitute upright walls and outer surfaces of the annular projections 1d are formed to constitute inclined walls. According to the invention, the annular projections 1d may be formed by suitable projections provided discretely at both ends of the holder 1.

The holder 1 may be made of, for example a thermoplastic resin, and particularly polybutylene terephthalate (PBT) and polypropylene (PP) may be advantageously used due to their superior properties such as a high heat distortion temperature, a high mechanical rigidity, a high electrical insulation and high mechanical performances. A diameter of the holder 1 may be suitably determined, while considering the number of and thickness of the electric wires to be used. A length of the holder 1 is usually set to about 20-150 mm. In general, the holder 1 may be manufactured by injecting a thermoplastic resin into a suitable mold, but the holder 1 may be also manufactured by grinding a thermoplastic resin rod.

The electric terminal 2 is formed by punching an electrically conductive metal plate, and a short tubular contact 2c is formed by reducing mill at an end portion of the tang-like portion of the L-shaped connecting portion 2a.

The electric terminal 2 may be formed by punching a cupper or cupper alloy plate or a Sn plated cupper or cupper alloy plate. A brass plate may be advantageously used due to its superior mechanical strength and electrical conductivity. When use is made of a Sn plated brass plate, an anticorrosion property is improved and a good electrical contact can be attained with respect to the pin terminal 4.

Figure 2:
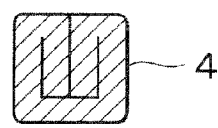
FIG. 2 is a cross sectional view of a pin terminal.
Figure 3:
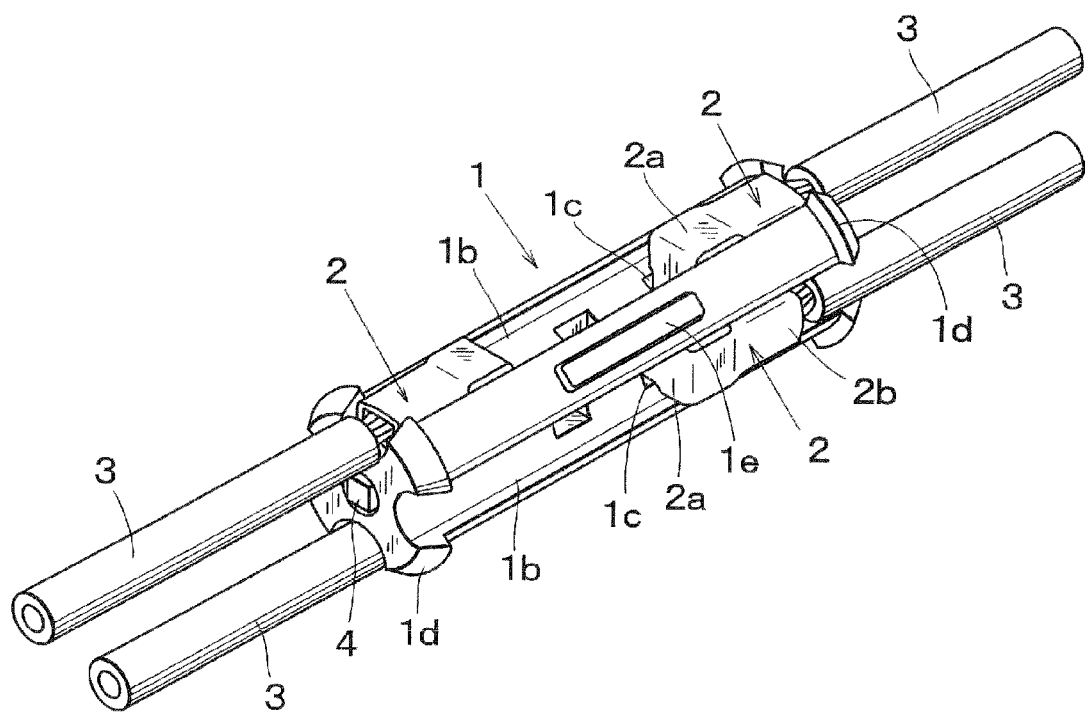
FIG. 3 is a perspective view showing an assembly.

The pin terminal 4 is formed by folding an electrically conductive plate into a rectangular cross sectional shape as depicted in FIG. 2. Then, the pin terminal 4 has a plurality of folded metal plates and a mechanical strength is sufficiently reinforced. It should be noted that the pin terminal 4 may be formed by a metal rod and may have a circular cross sectional shape.

Figure 4:
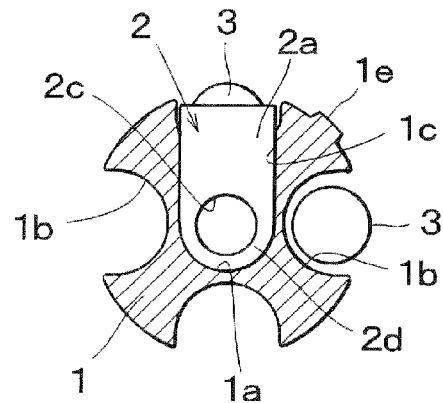
FIG. 4 is a cross sectional view depicting a condition in which a connecting part of an electric terminal is inserted into a holder.

Upon assembling, the connecting portion 2a of the electric terminal 2 having the electric wire 3 connected thereto is inserted into the electric terminal insertion hole 1c of the holder 1 as shown by an arrow in FIG. 1 and the electric wire 3 is extended along the elongated groove 1b. Since a free end portion of the connecting portion 2a is formed to have a shape substantially identical with a shape of the pin terminal insertion hole 1a, the connecting portion 2a is stably mounted within the pin terminal insertion hole 1a as illustrated in FIG. 4 and a center of the tubular contact 2c is aligned with a center of the pin terminal insertion hole 1a. In this condition, the connecting portion 2a inserted into the pin terminal insertion hole 1a is stably mounted by means of a suitably locking member not shown in the drawings, said locking member being provided on the electric terminal insertion hole 1c.

After a given number of the connecting portions 2a have been inserted into the electric terminal insertion holes 1c, the pin terminal 4 is inserted into the pin terminal insertion hole 1a with the aid of a suitable jig. During this inserting operation, the pin terminal 4 passes through the tubular contacts 2c of the connecting portions 2a of electric terminals 2. In this manner, the tubular contacts 2c are short-circuited by the pin terminal 4 and all the electric wires 3 are mutually conductively connected.

The cover member 5 is formed by a substantially tubular member made of a hard synthetic resin and having an inner diameter substantially equal to an outer diameter of the holder 1. The cover member 5 has formed therein a split slit 5a extending in a longitudinal direction, said split slit being able to be widened upon assembling. In both ends of the split slit 5a there are formed cut-out portions 5b, and in both side edges of the split slit 5a there are formed elongated recesses 5c which is engaged with the linear projection 1e of the holder 1.

Figure 5:
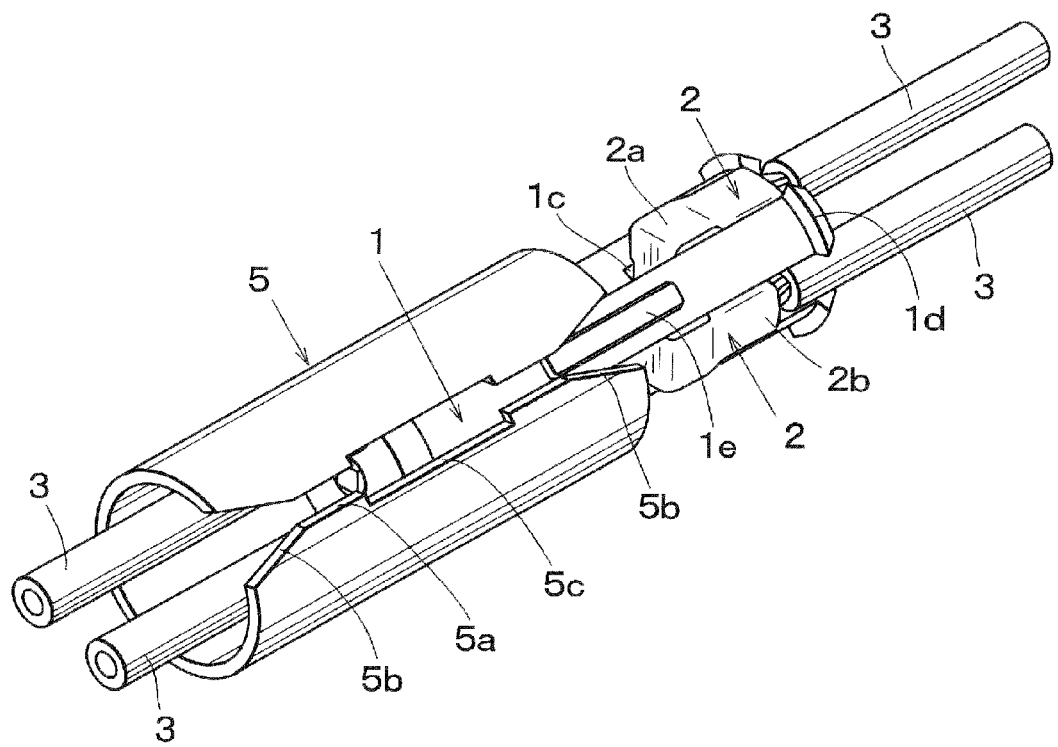
FIG. 5 is a perspective view representing a condition during a mount of the cover member.
Figure 6:
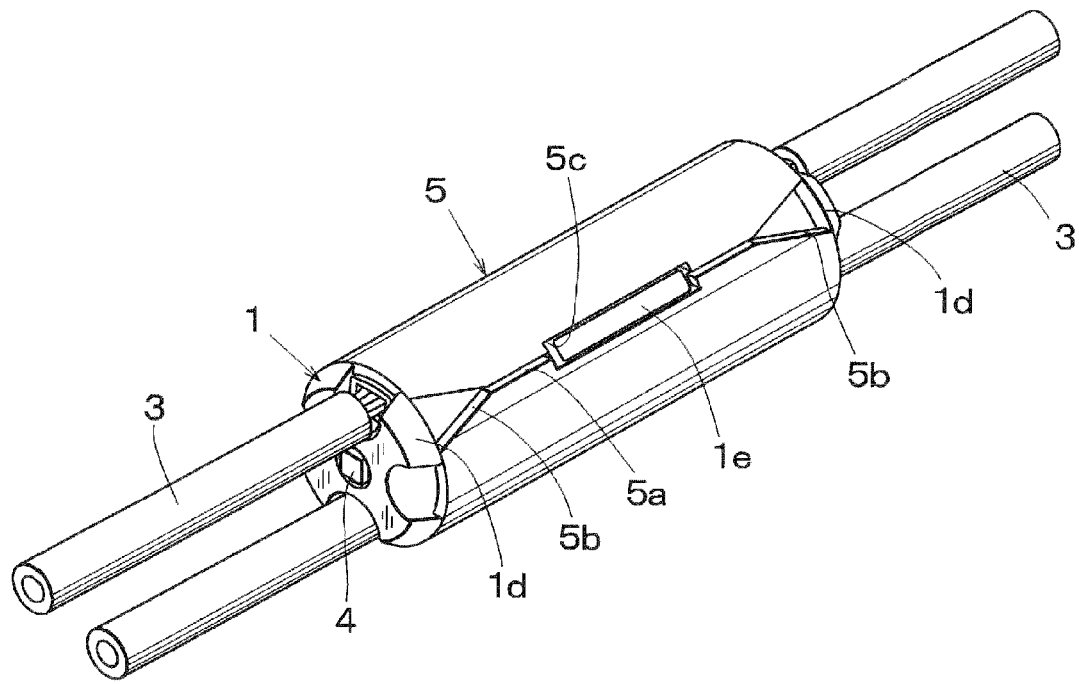
FIG. 6 is a perspective view showing a condition in which the cover member has been mounted.
Figure 7:
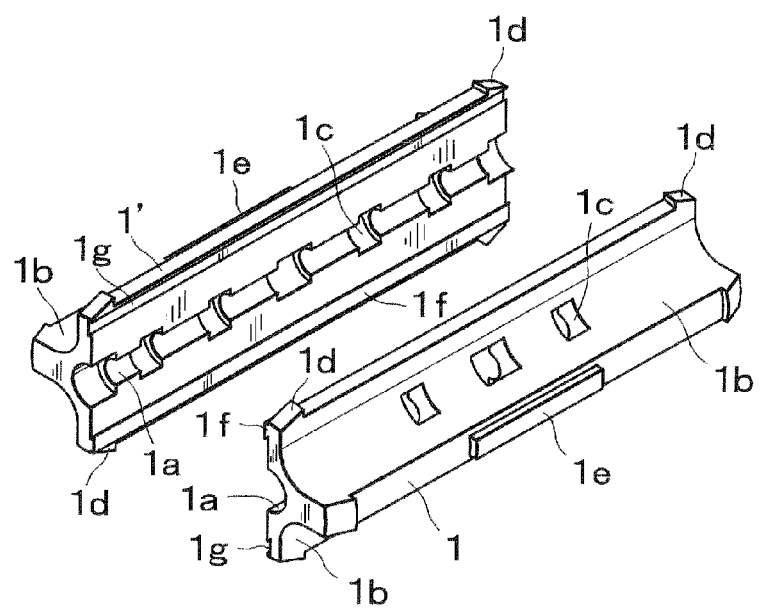
FIG. 7 is an exploded perspective view illustrating the holder of a second embodiment.

Upon mounting the cover member 5 onto the holder 1, the split slit 5a is widened by utilizing the cut-out portions 5b and a plurality of the electric wires 3 provided on one side of the holder 1 are inserted into the cover member 5. Then, the cover member 5 is moved toward the holder 1 and is further inserted over the holder 1 such that the front edge of the cover member 5 rides over the annular projections 1d provided at one end of the holder 1 as shown in FIG. 5 until the linear projection 1e of the holder 1 is engaged with the elongated recesses 5c of the cover member 5. In this manner, the mounting of the cover member 5 onto the holder 1 has been completed as depicted in FIG. 6. In this condition, the cover member 5 is prevented from moving in the longitudinal direction by the annular projections 1d provided at both ends of the holder and is further prevented from moving in the longitudinal direction as well as in the circumferential direction by the engagement of the linear projection 1e with the elongated recesses 5c.

It should be noted that the cover member 5 having the widened split slit 5a may be directly mounted on the holder 1 without previously inserting the electric wires 3 into the cover member 5 and moving the cover member 5 toward the holder 1.

Moreover, the elongated recesses 5c may be provided at a portion other than the split slit 5a. If the movement of the cover member 5 in the circumferential direction is allowed, the linear projection 1e of the holder 1 and the elongated recesses 5c of the cover member 5 may be dispensed with.

Embodiment 2

Figure 8:
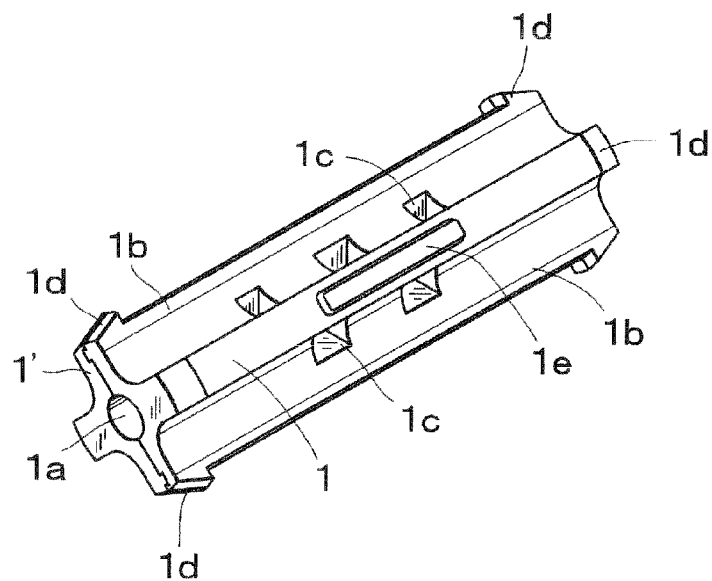
FIG. 8 is a perspective view showing an assembled holder.
Figure 9:
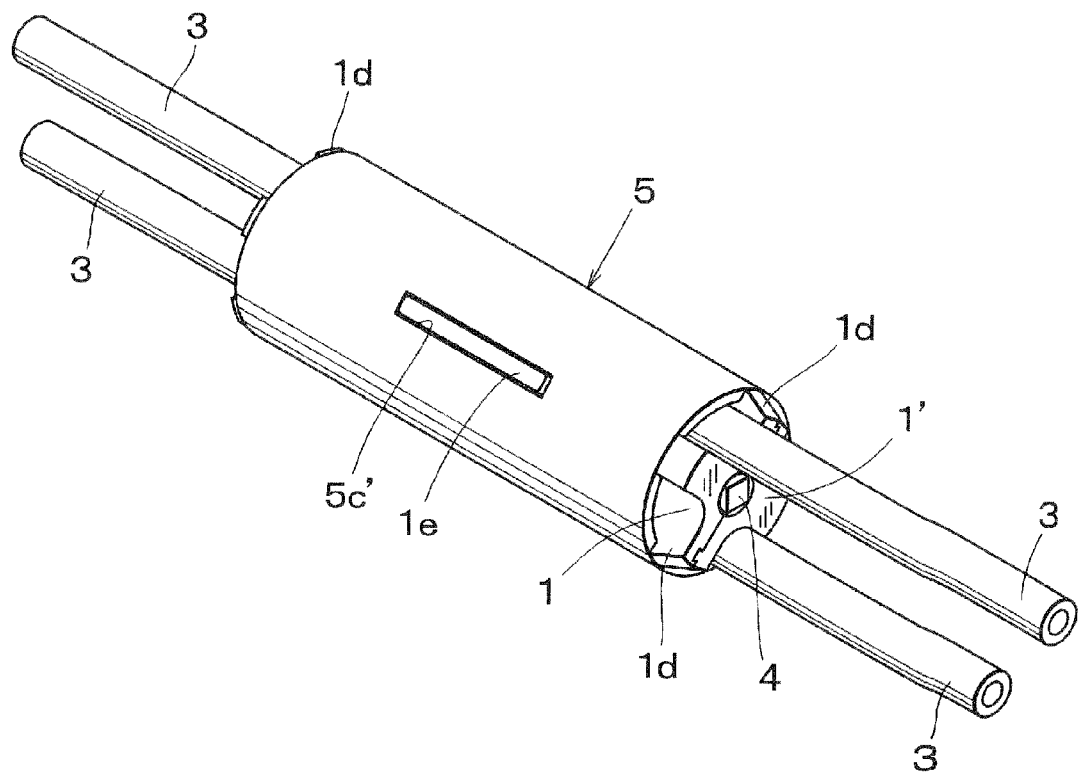
FIG. 9 is a perspective view illustrating a condition in which the cover member has been mounted on the holder.

In the second embodiment 2, in order to simplify the internal structure, the holder is formed by two holder halves 1, 1' as illustrated in FIG. 8. In FIG. 1, portions similar to those shown in FIG. 1 are denoted by the same reference numerals used in FIG. 1.

When the internal structure of the holder 1, 1' is simplified, the injection molding can be performed easily. The holder halves 1, 1' having the identical structure are obtained by dividing the holder 1 of the first embodiment in the longitudinal direction. In each of the holder halves 1, 1', there are formed a dovetail projection 1f and a cooperating dovetail groove 1g, and the holder halves 1, 1' can be firmly assembled by relatively sliding the holder halves 1, 1'. The assembled holder halves 1, 1' constitute the holder having a substantially cylindrical shape similar to the holder 1 shown in FIG. 1. The pin terminal insertion hole 1a is formed to insert the pin terminal 4 along the center axis of the assembled holder halves 1, 1'. In an outer surface of the holder 1, 1', there are formed four elongated grooves 1b having a substantially semicircular cross sectional shape. Furthermore, on the outer surface of each of the holder halves 1, 1', there is formed a linear projection 1e.

The cover member 5 has the elongated recess 5c formed along the split slit 5a and an elongated recess 5c' formed at a position diametrically opposed to the elongated recess 5c. Then, the cover member 5 is engaged with the holder 1, 1' by means of the two linear projections 1e and two elongated recesses 5c, 5c'.

The cover member 5 is mounted such that the divided holder halves 1, 1' could not be easily separated and the electric terminals 2 are not removed. The cover member 5 also serves to improve the electrical insulation of the electric terminals 2 arranged around the holder halves 1, 1'.

The harness connection members of the first and second embodiments 1 and 2 are advantageously used in automobile harness circuits.

What is claimed is:

1. A harness connection member comprising:
a holder formed by a substantially cylindrical body made of a synthetic resin; and
a tubular cover member made of a synthetic resin and having a split slit, wherein elongated recesses are formed in both side edges of the split slit;
wherein the holder has a pin terminal insertion hole which is formed along a central axis of the holder, a plurality of electric terminal insertion holes which extend from an outer surface to an inside of the holder and which are communicated with the pin terminal insertion hole, a linear projection formed on the outer surface of the holder, and annular projections which project outwardly and are formed at both ends of the holder, outer surfaces of the annular projections being formed as inclined walls;
wherein the cover member is mounted around the holder by moving a front edge of the cover member toward one end of the holder and inserting the holder into the cover member such that the front edge of the cover member rides over the annular projection provided at the one end of the holder; and
wherein when the cover member is in a mounted state around the holder, the cover member is disposed between the annular projections at both ends of the holder such that the cover member is prevented from moving in a longitudinal direction of the holder, and the linear projection on the surface of the holder is engaged with the elongated recesses in both side edges of the split slit of the cover member after the side edges of the split slit are closed.

2. The harness connection member according to claim 1, wherein elongated grooves are formed in the outer surface of the holder such that the elongated grooves extend in the longitudinal direction of the holder and electric wires connected to electric terminals are extended along the elongated grooves.

3. The harness connection member according to claim 2, wherein the annular projections are discretely formed at portions of both ends of the holder other than where the elongated grooves are formed such that circumferential edges of the annular projections form an annular shape.

4. A harness circuit for automobiles using the harness connection member according to claim 3.

5. A harness circuit for automobiles using the harness connection member according to claim 2.

6. The harness connection member according to claim 2, wherein the electric terminals are mutually connected within the holder.

7. A harness circuit for automobiles using the harness connection member according to claim 6.

8. The harness connection member according to claim 1, wherein the cover member has cut-out portions formed at both ends of the cover member.

9. A harness circuit for automobiles using the harness connection member according to claim 8.

10. The harness connection member according to claim 8, wherein the cut-out portions serve to allow the cover member to be easily widened.

11. A harness circuit for automobiles using the harness connection member according to claim 10.

12. The harness connection member according to claim 1, wherein the holder is formed by two holder halves having the same configuration, the two holder halves being assembled to constitute the holder.

13. A harness circuit for automobiles using the harness connection member according to claim 12.

14. A harness circuit for automobiles using the harness connection member according to claim 1.

* * * * *